(12) United States Patent
Och et al.

(10) Patent No.: US 8,626,486 B2
(45) Date of Patent: Jan. 7, 2014

(54) AUTOMATIC SPELLING CORRECTION FOR MACHINE TRANSLATION

(75) Inventors: Franz J. Och, Palo Alto, CA (US); Dmitriy Genzel, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 1395 days.

(21) Appl. No.: 11/850,623

(22) Filed: Sep. 5, 2007

(65) Prior Publication Data

US 2013/0144592 A1    Jun. 6, 2013

Related U.S. Application Data

(60) Provisional application No. 60/842,546, filed on Sep. 5, 2006.

(51) Int. Cl.
*G06F 17/28*    (2006.01)

(52) U.S. Cl.
USPC ........................................ 704/3; 704/2; 704/7

(58) Field of Classification Search
None
See application file for complete search history.

(56) References Cited

U.S. PATENT DOCUMENTS

| | | | | |
|---|---|---|---|---|
| 6,035,269 | A * | 3/2000 | Kim | .................................. 704/9 |
| 7,031,911 | B2 * | 4/2006 | Zhou et al. | ...................... 704/10 |
| 7,165,019 | B1 * | 1/2007 | Lee et al. | ........................... 704/2 |
| 7,403,888 | B1 * | 7/2008 | Wang et al. | ....................... 704/2 |
| 7,580,828 | B2 * | 8/2009 | D'Agostini | ........................ 704/2 |
| 7,752,034 | B2 * | 7/2010 | Brockett et al. | ................... 704/9 |
| 2001/0029455 | A1 * | 10/2001 | Chin et al. | ..................... 704/277 |
| 2005/0209844 | A1 * | 9/2005 | Wu et al. | ............................ 704/2 |
| 2006/0241944 | A1 * | 10/2006 | Potter et al. | .................... 704/254 |

FOREIGN PATENT DOCUMENTS

WO     WO2007/098055     8/2007

* cited by examiner

*Primary Examiner* — Jesse Pullias
(74) *Attorney, Agent, or Firm* — Remarck Law Group PLC

(57) ABSTRACT

Methods, systems, and apparatus, including computer program products, for correcting spelling in text. A text input is received for translation. One or more suspect words in the text input are identified. For each suspect word, one or more candidate words are identified. A score for the text input and scores for each of one or more candidate inputs are determined, where each candidate input is the text input with one or more of the suspect words each replaced by a respective candidate word. If any, a candidate input whose score is highest among the scores for the candidate inputs and is greater than the text input score by at least a threshold is selected. Otherwise, the text input is selected. A translation of a selected candidate input or the selected text input is provided as the translation of the text input.

25 Claims, 7 Drawing Sheets

Text input:    I love going to the threater

Suspect word:    threater

Candidate words
(including
combinations of
words formed by
dividing the suspect
word):

theater
threat
threaten
t htreater
th reater
thr eater
thre ater
threa ter
threat er
threate r

↓

Candidate inputs

I love going to the theater
I love going to the threat
I love going to the threaten
I love going to the t htreater
I love going to the th reater
I love going to the thr eater

•
•
•

Text input: I love going to the threater

Suspect word: threater

Candidate words (including combinations of words formed by dividing the suspect word):

theater
threat
threaten
t htreater
th reater
thr eater
thre ater
threa ter
threat er
threate r

Candidate inputs

I love going to the theater
I love going to the threat
I love going to the threaten
I love going to the t htreater
I love going to the th reater
I love going to the thr eater

AUTOMATIC SPELLING CORRECTION FOR MACHINE TRANSLATION

RELATED APPLICATIONS

This application claims the benefit under 35 U.S.C. §119 of U.S. Patent Application No. 60/842,546, titled "Automatic Spelling Correction for Machine Translation," filed Sep. 5, 2006, which is incorporated by reference herein in its entirety.

This application incorporates by reference the entire disclosure of U.S. Provisional Application No. 60/775,570 entitled "Encoding and Adaptive, Scalable Accessing of Distributed Models," filed Feb. 21, 2006.

BACKGROUND

The subject matter of this specification relates generally to machine translation.

The World Wide Web (the "web") includes web pages having text content written in a wide variety of natural languages. To avoid the time and expense of translating these web pages manually, machine translation systems have been adapted to translate text in web pages. For example, some online machine translation services allow a user to submit a Universal Resource Locator (URL) of a web page. The translation service obtains text from the web page located at the submitted URL, translates the text, and outputs a translation for display to the user.

A drawback of machine translation systems is that such systems may assume that the text has correct spelling. Any incorrectly spelled word in the input text may result in an incorrect, incomplete, or incomprehensible translation. Asking the author of the web page or the user requesting the translation to correct the spelling in the web page would generally be impractical.

SUMMARY

In general, one aspect of the subject matter described in this specification can be embodied in methods that include receiving a text input including words in a source language for translation; identifying one or more words in the text input as suspect words; for each suspect word, identifying one or more candidate words; determining a score for the text input; determining a score for each of one or more candidate inputs, each candidate input being the text input with one or more of the suspect words each replaced by a respective candidate word; selecting a candidate input whose score is highest among the scores for the candidate inputs and is greater than the score for the text input by at least a predefined threshold, if any, and otherwise selecting the text input; and providing as the translation of the text input into a target language a translation of the selected candidate input into the target language if the candidate input was selected, or a translation of the text input into the target language if the text input was selected. Other embodiments of this aspect include corresponding systems, apparatus, computer program products, and computer readable media.

In general, another aspect of the subject matter described in this specification can be embodied in methods that include receiving a text input including words in a source language for translation; identifying one or more words in the text input as suspect words; for each suspect word, identifying one or more candidate words; obtaining from a machine translation system a translation of the text input into a target language and a translation of each of one or more candidate inputs into the target language, each candidate input being the text input with one or more of the suspect words each replaced by a respective candidate word; determining a score for the text input translation; determining a score for each of the candidate input translations; and providing as the translation of the text input into the target language a candidate input translation whose score is highest among the scores for the candidate input translations and is greater than the score for the text input translation by at least a predefined threshold, if any, or the text input translation. Other embodiments of this aspect include corresponding systems, apparatus, computer program products, and computer readable media.

Particular embodiments of the subject matter described in this specification can be implemented to realize one or more of the following advantages. Machine translation of text can be more efficient. Spelling errors or regional spelling variations in text can be accounted for by a translation system when the translation system is attempting to translating the text.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 illustrates an example of a machine translation input and candidate inputs with candidate words substituted for the suspect word.

Like reference numbers and designations in the various drawings indicate like elements.

DETAILED DESCRIPTION

Figure 1:
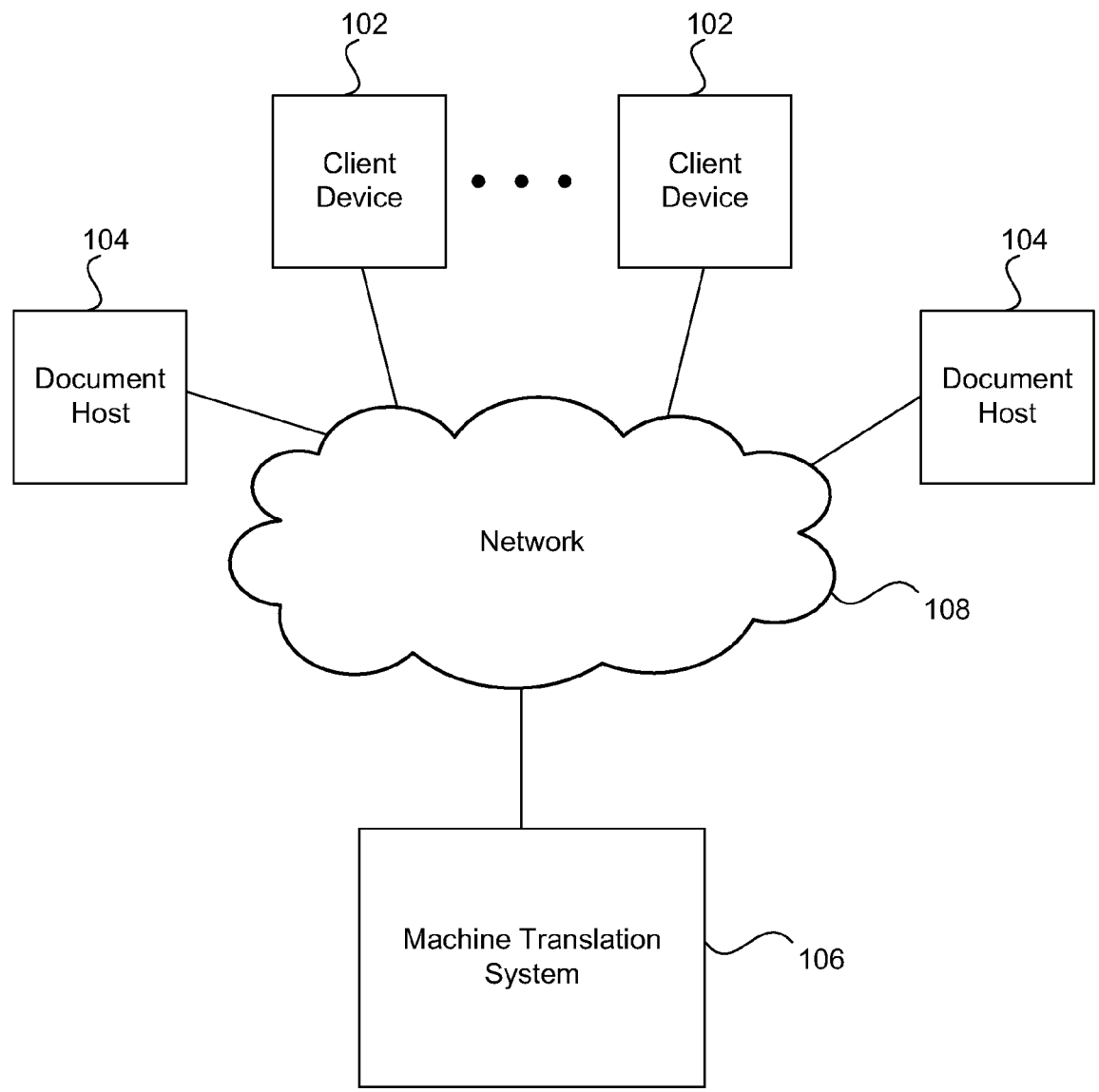
FIG. 1 is a block diagram illustrating a machine translation system in context.

FIG. 1 is a block diagram illustrating a machine translation system in context. One or more client devices 102, one or more document hosts 104, and a machine translation system 106 are interconnected by a data communication network 108. The network 108 can include, without limitation, a local area network (LAN), a wide area network (WAN), wired or wireless networks, the public Internet, or any combination of them.

A client device 102 can be any device that can communicate with other computers, systems, or devices. Examples of client devices include desktop computers, notebook computers, network terminals, personal digital assistants (PDAs), media player devices, mobile phones, smartphones, set-top boxes, video game consoles, and so on. The client device 102 can include one or more processors, volatile memory, non-volatile memory, output devices (e.g., a display, an audio output), and input devices (e.g., keyboard, mouse, buttons). In some implementations, the client device includes an application (e.g., a web browser). A user can access a web-based user interface of the machine translation system 106 or document hosts 104 through the web browser, for example.

The machine translation system 106 translates documents containing text written in natural (i.e., human) languages. The machine translation system 106 translates text written in a source natural language into text written in a target natural language. The text input, the text to be translated, can be provided by a user or retrieved by the machine translation system 106. The output of the machine translation system 106, the text in the target language, can be displayed to a user, used as an input of another process, and/or stored in storage (e.g., in any form of volatile or non-volatile memory).

In some implementations, the text input to be translated is provided by a user. For example, a user can access, from a client 102, a web-based interface to the machine translation system 106. The web-based interface allows the user to enter and submit a block of text to be translated in a fillable online form, to upload a document file containing the text to be translated (e.g., a plain text document, a Portable Document Format (PDF) document, etc.), or to submit a URL of a web page containing the text to be translated. The user can also specify the source language and the target language. The machine translation system 106 receives the text input, translates the input, and outputs the translation to the user by displaying the translation at the client 102 or transmitting a document file containing the translation to the client 102.

In some other implementations, the machine translation system 106 can be configured by a user or an administrator to automatically retrieve the text input. For example, the machine translation system 106 can be configured to automatically retrieve and translate documents from a particular domain or at particular URLs. The documents can be retrieved from document hosts 104, where the documents are stored.

The machine translation system 106 can include a plurality of computers (e.g., servers). In some implementations, the machine translation system 106 is a distributed system. The distributed system can be implemented in different manners. Partition and replication are two examples of various techniques available for implementing the distributed system. In partition, a particular item within such a system, e.g., a database server or a processing server, is divided or partitioned into different partitions that are physically located on different machines (e.g., computers), respectively. Each partition is less than the entire item and different partitions can be different from one another in some implementations and can have some degree of overlap in other implementations. Partition allows a large item to be implemented in the system without being limited to the capacity of a single machine. Because different partitions are at different machines and can be accessed separately, the partition can, among other beneficial features, handle high load and allow for scalability and reliability. The scale and other specific details of the partition can certainly vary depending on the requirements and restraints in a particular automated processing system. A large database, for example, may be difficult to store in a single machine (e.g., a database server) or it may not be economical to use a single expensive machine to store the large database. Accordingly, the large database may be partitioned into a number of smaller database partitions so that each of a number of selected machines has a sufficient storage to store each database partition. Different machines may be networked to operate as a "virtual" single database to a client accessing the database. A processing server may also be partitioned into different partitioning processing servers where each partitioning processing server provides a portion of the processing function of the original processing server and different partitioning processing servers are designed to partition mostly different processing functions.

Replication is another technique for the distributed system and is different from partition. In replication, a particular item within such a system, e.g., a database server or a processing server, is duplicated or cloned onto one or more replica machines such as computers. Each replica may be substantially identical to the item being replicated in function and other aspects. Replication allows an item to be implemented in a way that increases the availability or the capacity for any function of the item being replicated, to reduce the latency or delay in accessing any function of the item being replicated, and to provide redundancy for any function of the item being replicated. Because a single item usually has a limited capacity, replication makes the function of the item being replicated available to multiple requests from clients when such requests are made either the same time or processing and serving of the different requests overlap in time. The redundancy of the replication is that, if one machine for the item fails, one or more other replicated machines for the item are still available to the system. Notably, the scale and other details of the replication can vary depending on the requirements and restraints in a particular automated processing system. A highly used database, for example, may be replicated on different database servers. As another example, a processing server may be replicated into one or more replica processing servers that can operate in parallel with one another. Like the partition, replication may be implemented to be invisible to a client accessing the system because different machines that replicate the same processing server may be networked to operate as a "virtual" single processing server to a client accessing the database.

A replication design, when implemented, can incorporate a load balancing mechanism to monitor the work load of different machines for the replication and, based on the work load, to manage or distribute incoming work load to the different machines. This load balancing mechanism can be implemented with different load balancing policies depending on the requirements and constraints of the specific automated processing system. As an example, the load balancing mechanism may be implemented to reduce the delay in accessing a particular function or a piece of information in the replicated part of the system by directing new requests to a replicated machine operating in a light load or in an idle mode.

The load balancing mechanism may be extended to managing operations of different machines that are not exactly replicas of one another as described above. For example, several processing servers, such as machine translation servers, may operate based on different language translation resources using the same machine translation scheme (e.g., all are statistical machine translation ("SMT") servers or servers but with different language models). Here, some SMT servers may produce high-quality translations at slow speeds while others may produce low-quality translations at high speeds. A load balancing mechanism may be implemented to control the translation tasks of different segments of a document or different documents based on one or more considerations, such as the quality and timing requirements and constraints. In this example, the load balancing mechanism, although its name still suggesting some "load" balancing operations, does balance something that is not necessarily the work load of different machines. The term "load" balancing as used in this disclosure, thus, is not intended to limit the function to literally loading balancing. Rather, for lack of a better generic term and for the vivid image of the "load balancing," the term "load balancing mechanism," "load balancer," and "load balancing module," and "load balancing server" are generally used to indicate a mechanism that manages and distributes requests or tasks at different machines in balancing certain considerations associated with the operations and conditions of the machines, the nature of the requests or tasks, and operations and conditions of other parts of the system. In some implementations, the load balancing mechanism may be implemented as a component attached to a machine that is primarily designed for a function different from the load balancing mechanism, or as an individual machine in situations where the balancing mechanism may be handling high traffic to some machines. To be sure, the partition and replication for the distributed machine processing of this disclosure can certainly apply to the load balancing mechanism with different machines when needed.

In some implementations, a distributed machine translation system can include machine translation resource servers and a translation server. Each machine translation resource server stores and is operable to serve a partition of a collection of machine translation resource data for translation from a source natural language to a target natural language. The respective partitions together constitute the collection of machine translation resource data and each respective partition is less than the collection of machine translation resource data. The translation server is operable to receive source text in the source natural language to be translated into the target natural language and is further operable to obtain machine translation resource data from the machine translation resource servers and to use the obtained machine translation resource data to translate the source text into the target natural language.

Figure 5:
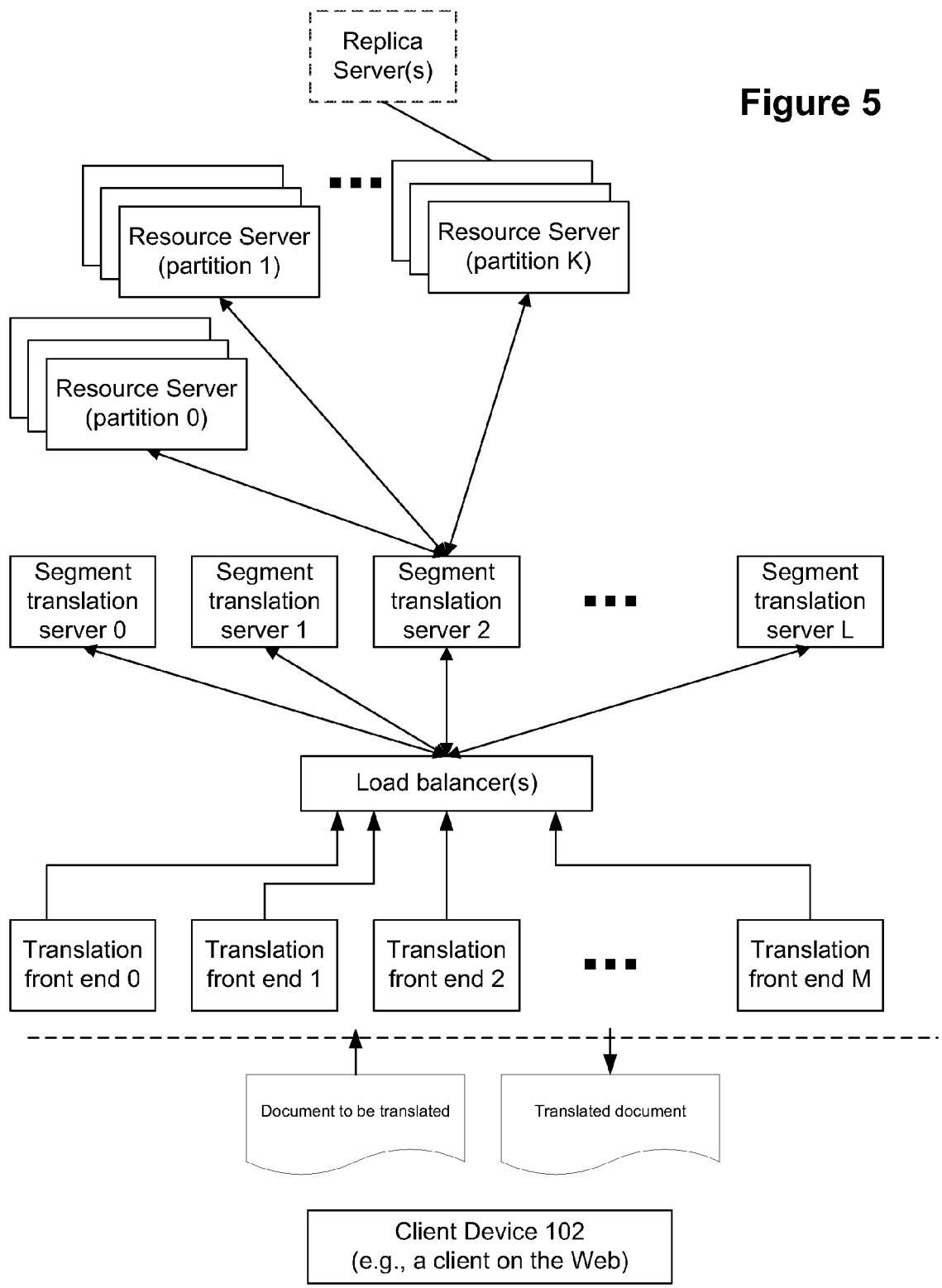
FIG. 5 is a block diagram of a distributed machine translation system to illustrate specific applications of the partition, replication and load balancing of the distributed machine processing of this disclosure.

As an example of the above implementation, FIG. 5 is a block diagram of a distributed machine translation (DMT) system to illustrate specific applications of the partition, replication and load balancing of the distributed machine processing of this disclosure. Parameters K, L and M are positive integers (i.e., 1, 2, ... ). Multiple translation front ends, which may be computer servers, are arranged in parallel with one another and are used to interface with requests from client devices 102 for translating documents and deliver translated documents to client devices 102. A client may be connected on a computer network such as the Internet to which the DMT system in FIG. 5 is linked. The DMT system also includes segment translation servers that interface with translation resource servers to retrieve translation resource data and use the retrieved data to perform translation tasks. A load balancer server is connected between the segment translation servers and the translation front ends to monitor, manage and control exchanges between the translation front ends and the segment servers and operations of the translation front ends and the segment servers. The load balancer server can be replicated with one or more replica load balancer servers.

The translation front ends are in the replication configuration and operate in parallel with one another. The segment translation servers are also in the replication configuration. The resource servers are partition servers that store partitions of the entire translation resource data and other resources and information for the segment translation servers to perform the translation tasks. Each resource server is shown to have one or more replica resource servers. The translation resource data and other resources and information in the resource servers may include one or more language models for one or more different natural languages, one or more translation models for translations between one or more different source natural languages and one or more different target natural languages, one or more transliteration dictionaries between one or more source natural languages and one or more target natural languages, and other dictionaries or vocabularies. Segment translation servers may implement the same or different machine translation decoding schemes such as rule-based machine translation and statistical machine translation.

Each translation front end operates to receive a document to be translated by the system and to send the translated document to the client. Upon receiving a document, the translation front end divides the document into multiple smaller segments where each segment may include one or more tokens. One example of a segment is a sentence within a paragraph. The content of a segment may vary in different implementations and may be, range from words to multiple sentences. The front end may direct all segments to the load balancer for distribution to the segment translation servers and a segment translation server processes the assigned segment and translates the assigned segment by using desired translation resource data from one or more resource servers. Each translated segment is then sent back to the original requesting translation front end via the load balancer. After receiving all translated segments back, the original requesting translation front end assembles the translated segments into a translated document and sends the translated document to the client. In some implementations, the front end may first determine whether a proper translation for a segment is available and retrieves that translation as the translated segment without sending that segment to the load balancer.

A load balancing mechanism, a "back end" load balancing mechanism, that is different from the load balancer, may be implemented between the resource servers and segment translation servers. In one implementation, each segment translation server may include a segment load balancer as part of the server to control, manage, distribute the requests from that segment translation server to the resource servers. The entire segment load balancers together constitute the back end load balancing mechanism. Each segment load balancer can certainly be a separate machine if so desired and may be replicated or even partitioned if needed.

Each load balancing mechanism can include a monitoring mechanism to monitor activities, conditions and operations of various machines involved in the operations of that load balancing mechanism. This may be implemented in various ways. For example, a communication protocol may be used to provide monitoring communications between the load balancing mechanism and each machine under monitoring.

Figure 6:
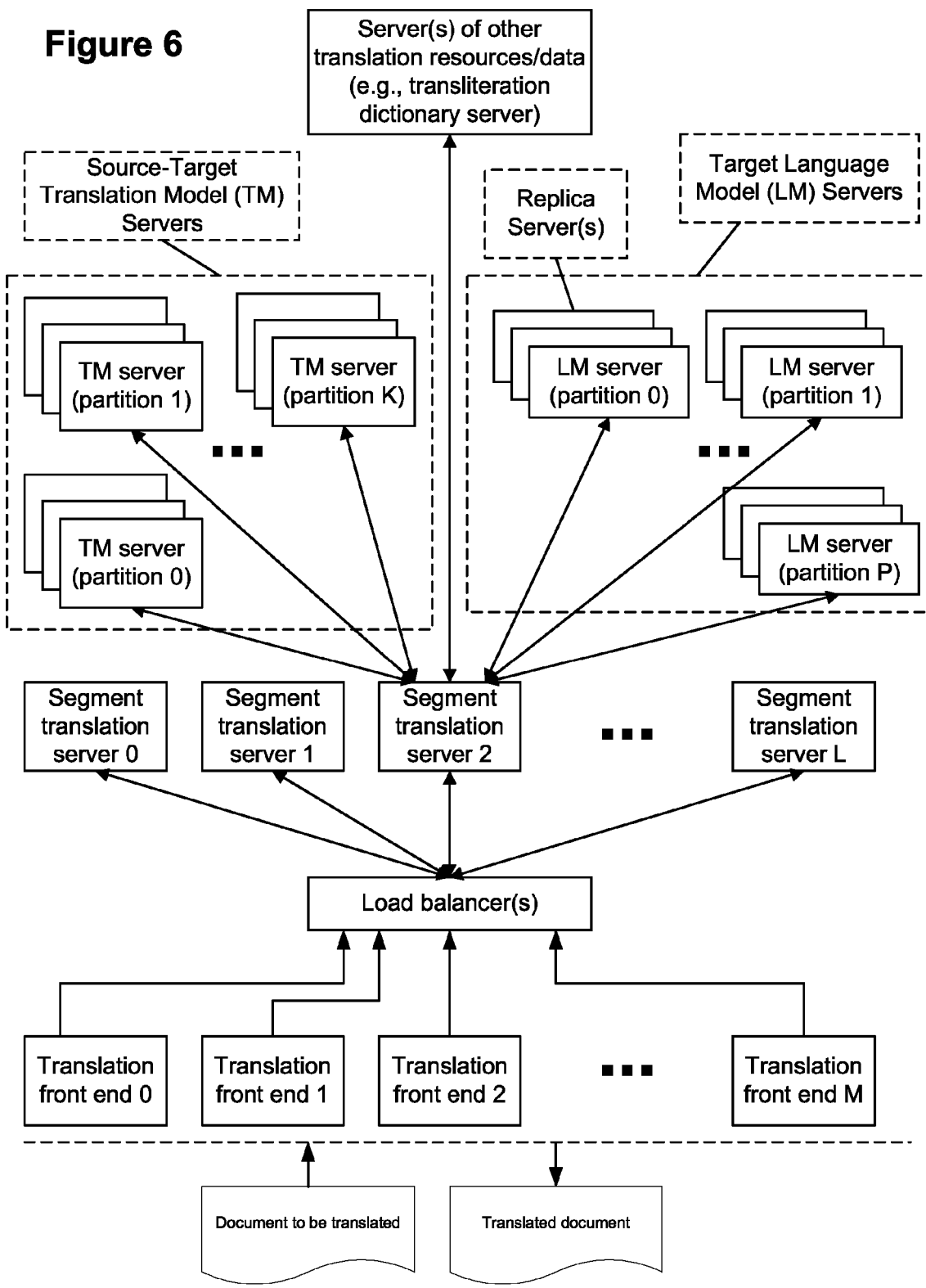
FIG. 6 is a block diagram of one implementation of the distributed machine translation system in FIG. 5 that uses a translation model and a language model, where P is a positive integer representing the number of language model partitions.

FIG. 6 is a block diagram of one implementation of the distributed machine translation system in FIG. 5 that uses a translation model and a language model for a statistical machine translation (SMT). SMT decoders may be implemented in at least some of the segment translation servers. The translation model provides mapping information between the source natural language and the target natural language and scoring information associated with each mapping. In one implementation, for example, the mapping information between the source natural language and the target natural language may be many possible pairs of language strings between the target and source natural languages. The scoring information may include statistical data for each mapping between the source natural language and the target natural language such as a probability a pair of language strings between the target and source natural languages. Other statistical data may also be used as the scoring information. The language model provides many possible language strings in the target natural language and the corresponding language model scoring information for each string. A string includes one or more language tokens and a token can be the smallest language unit handled by the system. Each string can be an n-gram which is a sequence of n tokens in the target natural language, wherein n is a positive integer. Various tokenization techniques may be used to construct a token from one or more of symbols and marks including diacritical marks and punctuation marks, letters, and characters in a natural language. The language model scoring information can include statistical data for each string or n-gram in the language model. The statistical data may include information related to a respective frequency of occurrence of each of the respective n-grams in a corpus of natural language text, such as a probability, a smoothing probability, or a smoothing coefficient that is related to a respective frequency of occurrence of each of the respective n grams in a corpus of target natural language text. The language model scoring information may also include information other than statistical data.

A SMT decoder in a segment translation server, after receiving an assigned segment to decode, first retrieves needed information from the translation model and then requests needed data from the language model based on the information from the translation model. The SMT decoder computes statistics on all possible translations from various arrangements of tokens in the target natural language and search for the best translation.

The translation quality of a statistical machine translation (SMT) system, if properly designed, can be improved by increasing either or both of the translation model (TM) and the language model (LM) of the system. Hence, the DMT system in FIG. 6 may have large TM and LM that may require partition in practice. For example, a currently available LM for English is about 200 billion words in size. A large TM may be on the order of magnitude of 200 million words. As more documents are made available on line, the LM may increase further in size. Hence, partition described in this disclosure provides an effective approach to high-quality MT systems using the distributed machine processing in the system configurations shown in this disclosure and other system configurations. Certainly, replication and load balancing are desired features in such DMT systems and other MT systems.

FIG. 6 further shows one or more servers for other translation resources and data in addition to the LM and TM servers. This feature may be an optional feature to further improve various properties of the system in FIG. 6. For example, a segment translation server may be designed to use other translation resources and data for translating a segment with or without the SMT processing with LM/TM data. Examples for the one or more servers for other translation resources and data include a transliteration dictionary server between the target and source natural languages, a rule-based machine translation server, a transliteration processing server which a rule-based algorithm to produce transliteration data, and other resources that aid the translation from the source natural language to the target natural language.

The example in FIG. 6 is one implementation of a MT system using LM/TM. This type of systems may include language model servers, a translation model server serving a translation model; and a translation server operable to receive source text in a source natural language to be translated into the target natural language. Each language model server stores and is operable to serve a partition of a language model for the target natural language and the respective partitions together constitute the entire language model. The translation server is operable to perform machine translation obtaining translation model data from the translation model server and obtaining language model data from language model servers.

As an example, a MT system using LM/TM can include language model servers respectively storing and operable to serve different partitions of a language model for a particular target natural language. The respective partitions together constitute the entire language model and each respective partition is less than the whole of the language model. One or more replica language model servers can be included for each of the language model servers. This system also can include translation model servers respectively storing and operable to serve different partitions of a translation model for translation between the target natural language and a human source language. The respective partitions together constitute the entire translation model and each respective partition is less than the whole of the translation model. One or more replica translation model servers can be included for each of the translation model servers. Translation front ends can also be included where each is operable to divide source text, in the natural language to be translated into the target natural language, into segments in the source natural language. This system can include segment translation servers each operable to perform machine translation obtaining translation model data from the translation model servers and the replica translation model servers and obtaining language model data from language model servers and the replica language model servers. A load balancing module can also be included and is operable to assign the segments to one or more of the segment translation servers for translation, according to translation load at the segment translation servers.

The machine translation system 106 also includes functionality for determining scores for texts and translations of the texts. For example, the DMT system described above can determine scores for a translation of a text (e.g., a document) using statistical data derived from a language model and/or a translation model. Further, the machine translation system 106 can include functionality for determining scores for texts. In some implementations, a text is scored using statistical data in a language model for the source language of the text. The score can be determined as a probability of occurrence of the text based on the statistical data for the words in the text. In some implementations, in the DMT system, the text scoring functionality can be included as modules, instruction sets, or the like in the translation servers or servers for additional resources described above; or they can be in additional servers.

The machine translation system 106 can perform translation using any of a number of machine translation techniques. In some implementations, a statistical machine translation technique is used to perform translation from a source language to a target language based on a translation model associated with the source and target languages and a language model associated with the target language. The machine translation system 106 can include one or more computers, such as computer servers, for storing the translation models and language models used in the machine translation processes and for serving data from those models to other parts of the machine translation system 106. In other implementations, the machine translation system 106 implements a rules-based machine translation technique, or a hybrid statistical and rule-based technique, and the machine translation system 106 can include servers for storing the rules.

In some other implementations, translation can be performed using translation templates or patterns that might be applied recursively. An example of a translation template is a sentence in a source language and a corresponding, pre-specified translation in a target language. The source language sentence includes one or more placeholders for words. The target language translation of the sentence includes placeholders that corresponds to the placeholders in the source language sentence. A translation of a word that appears in place of a placeholder in the source language sentence replaces the corresponding placeholder in the target language translation.

In some implementations of statistical machine translation techniques, the translation model includes mapping information between the source natural language and the target natural language and scoring information associated with each mapping. The mapping information can include a relation between (1) one or more tokens (e.g., ideograms, words, phrases, etc.) in the source natural language and (2) one or more tokens (e.g., ideograms, words, phrases, etc.) in the target natural language. In some implementations, the mapping information between the source natural language and the target natural language can be many possible pairs of language strings between the target and source natural languages. The scoring information can include statistical data for each mapping, such as a probability of a pair of language strings. Other statistical data can also be used as part of the scoring information.

The language model for a language includes a collection of possible strings of text in the language and corresponding language model scoring information for each string. A string is made up of one or more language tokens. A token is the smallest language unit handled by the system. Each string can be an n-gram, which is a sequence of n tokens in the language, where n is a positive integer. Various tokenization techniques can be used to construct a token from one or more of symbols and marks, including diacritical marks and punctuation marks, letters, and characters, in the language. The language model scoring information can include statistical data for each n-gram in the language model. The statistical data generally includes data representing a frequency of occurrence of each of the respective n-grams in a corpus of text, such as a probability, a smoothed probability, or a smoothing coefficient that is related to a respective frequency of occurrence of each of the respective n-grams in the corpus of text. The language model scoring information can also include information other than statistical data.

The language model for a language and a translation model between a source language and a target language can be generated from a large corpus of documents. The corpus of documents may be drawn from a wide variety of sources or from sources of a particular kind. For example, a corpus of documents that is meant to be representative of the English language generally may include English-language documents that are drawn randomly from all over the World Wide Web. A language model that is generated from such a corpus may be used to model the English language generally. As another example, a corpus of documents that is meant to be representative of the English language as used in news articles may include English-language documents that are drawn only from news sources and news organizations. A language model generated from such a corpus can be used to model the English language as used in the news context. Similarly, a translation model may model translation between languages generally or within specific contexts based on the corpus or corpora of documents from which the translation model is generated.

A vocabulary or dictionary can also be generated from a corpus of documents. In some implementations, the vocabulary or dictionary includes unique words, including any misspelled words, that appear in the corpus of documents and their corresponding frequencies of occurrence within the corpus. In some other implementations, a vocabulary or dictionary includes distinct n-grams that occur in the corpus of documents, where n is a positive integer. In one exemplary implementation, n is 5. A probability of occurrence of a word can be determined based on the frequency of occurrence of the word within the corpus or vocabulary or the frequencies of occurrence of the corresponding n-grams of a specified length within the corpus or vocabulary, and the size of the vocabulary and/or corpus. Depending on the corpus of documents from which the vocabulary is generated, the vocabulary may model the frequencies of words or n-grams in a language generally or in particular contexts. The vocabulary may be considered an extension of the language model.

In operation, a machine translation system 106 that uses a statistical machine translation technique, after receiving an input to translate, first retrieves needed data from the translation model and then retrieves needed data from the language model based on the information from the translation model. The system computes statistics on many possible translations from various arrangements of tokens in the target natural language and searches for a best translation, which the machine translation system 106 presents to a client 102 or other systems.

The input into the machine translation system 106 includes text to be translated. The text includes one or more words. Some of these words may be misspelled. If these misspellings are not corrected, the output translation may be incomplete, incorrect, or incomprehensible. The machine translation system 106 may perform automatic spelling correction on the text before translating the text or as part of the search for the best translation, further details of which are described below.

Figure 2:
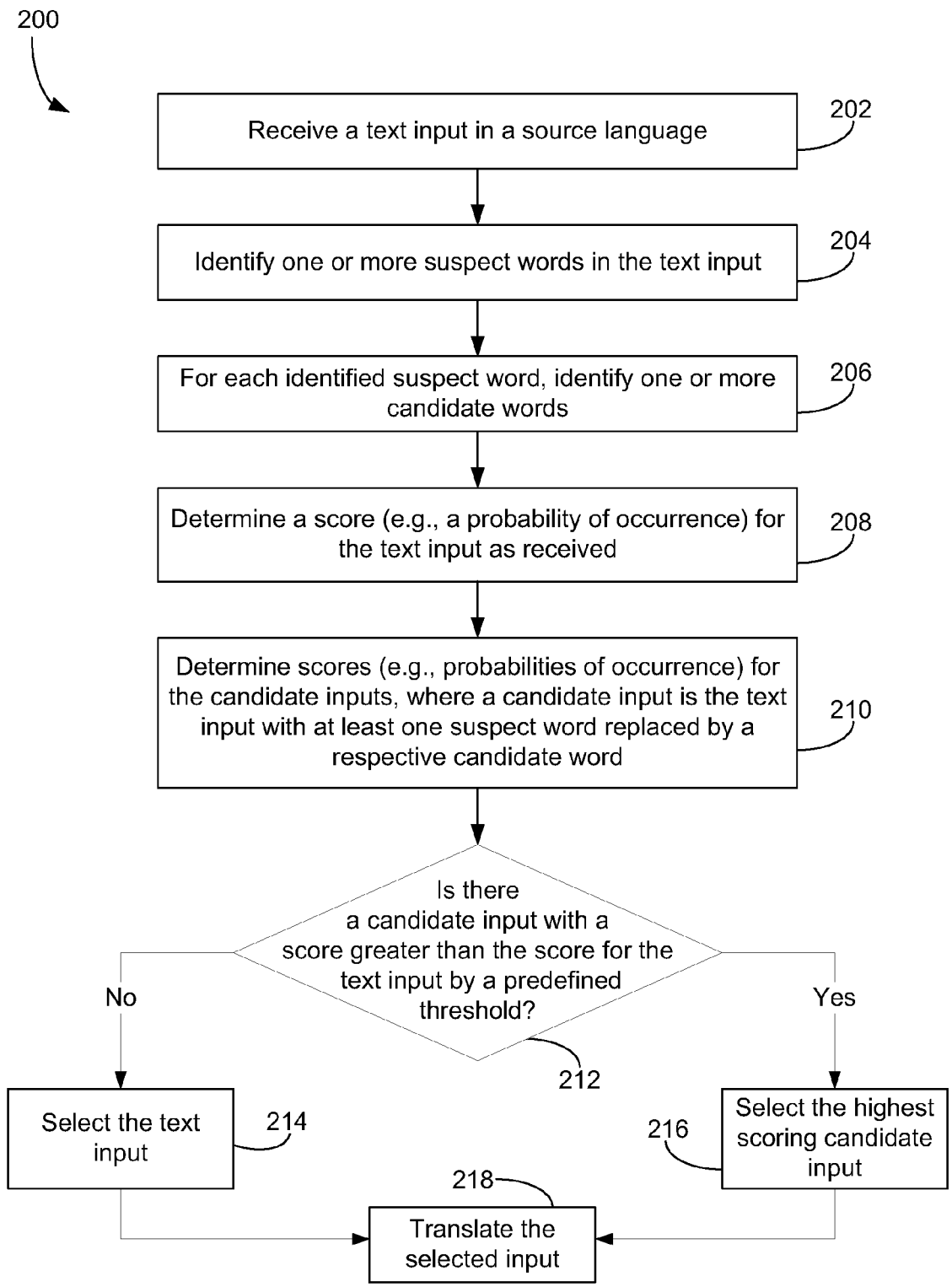
FIG. 2 is a flow diagram illustrating an example process for automatically correcting spelling in a machine translation input.

FIG. 2 is a flow diagram illustrating an example process 200 for automatically correcting spelling in a machine translation input. A text input is received by the machine translation system (202). The text in the text input is written in a source language and may include one or more words. The text input here may be the whole or a part of a document of text to be translated. One or more suspect words in the text input are identified (204). In some implementations, a word is identified as suspect based on the frequency of occurrence of the word. That is, a word may be identified as a suspect word if it has a "low" frequency of occurrence. The frequency of occurrence of a word can be determined from the language model and/or a vocabulary for the language in which the text input is written. In some implementations, a "low" frequency of occurrence is a frequency that is below a predefined frequency floor, which may be expressed as an absolute number of occurrences in a corpus or vocabulary. In some implementations, the frequency floor is 50. In another example implementation, the frequency floor is 10. In some implementations, a different floor may be set for different languages, and a floor may be adjusted based on the size of the corpus of documents and/or size of the vocabulary.

For each identified suspect word, one or more candidate words are identified (206). One or more candidate words are identified for each suspect word. In some implementations, the candidate words are identified from the vocabulary and/or the language model for the source language. In some other implementations, the candidate words are be identified from the vocabularies and/or translation model associated with the source and target languages. In some implementations, words below a predefined frequency threshold are ignored when searching a vocabulary for possible candidate words. The frequency threshold may be an absolute number or a function of the frequency of the suspect word.

In some implementations, the candidate words are those words in the vocabulary having an edit distance (e.g., the Levenshtein distance) from the suspect word that is less than a predefined edit distance threshold (but greater than 0). In some implementations, the edit distance threshold is 2; and a candidate word is a word that has an edit distance of 1 from the suspect word. In some other implementations, the edit distance threshold is 3; and a candidate word is a word that has an edit distance of 1 or 2 from the suspect word.

A score for the text input as it was received by the machine translation system is determined (208). In some implementations, the score for the text input is the probability of occurrence of the text input, determined using a language model for the source language of the text input. One or more candidate inputs written in the source language are generated and scores for these candidate inputs are determined (210). In some implementations, a candidate input is the text input with one or more of its suspect words replaced by a respective candidate word. In some implementations, the score for the text input or a candidate input is the probability of occurrence of the text input or the candidate input, respectively, determined using a language model for the source language. For example, if the text input and the candidate input are sentences, then the score of the text input or a candidate input is the probability of occurrence of the sentence, which can be calculated as the product of conditional probabilities of the words in the sentence. For example, the probability of occurrence of the sentence can be calculated as the probability of the first word in the sentence multiplied by the probability of the second word given the first word, multiplied by the probability of the third word given the second word, and so forth. In some implementations the probability of occurrence of a word is the frequency of occurrence of the word, as indicated in the language model, divided In some implementations, particular techniques can be used to make the process of finding the highest scoring input more efficient. In an example implementation, dynamic programming is used. In another example implementation, a score is determined for an input using less than all of the words of the input. For example, if the suspect word is near either end of the input, then the score may be determined using the words in that vicinity.

If there is a candidate input whose score is greater than the score of the text input by at least a predefined threshold (212—Yes), then the highest scoring candidate input (whose score is greater than the score of the text input by at least the predefined threshold) is selected (216). If multiple candidate inputs have scores greater than the score of the text input by at least the predefined threshold, the candidate input among the candidate inputs with the highest score (e.g., highest probability of occurrence) is selected. If none of the candidate inputs have scores that are higher than the score of the text input by the predefined threshold (212—No), the text input is selected (214). In some implementations, the predefined threshold is N times the text input score, where N is a real number greater than 1.0. In some implementation, N is 10. In some other implementations, N is 2 or 3.

The selected input is translated into a target language (218). If a candidate input was selected, then the selected candidate input is translated. If the text input was selected (because none of the candidate inputs had a score higher than the threshold), then the text input is translated. The translation output can be transmitted to a client 102 for presentation to a user, stored and/or processed further within the machine translation system, or transmitted to other computers for further processing or storage.

Figure 3A:
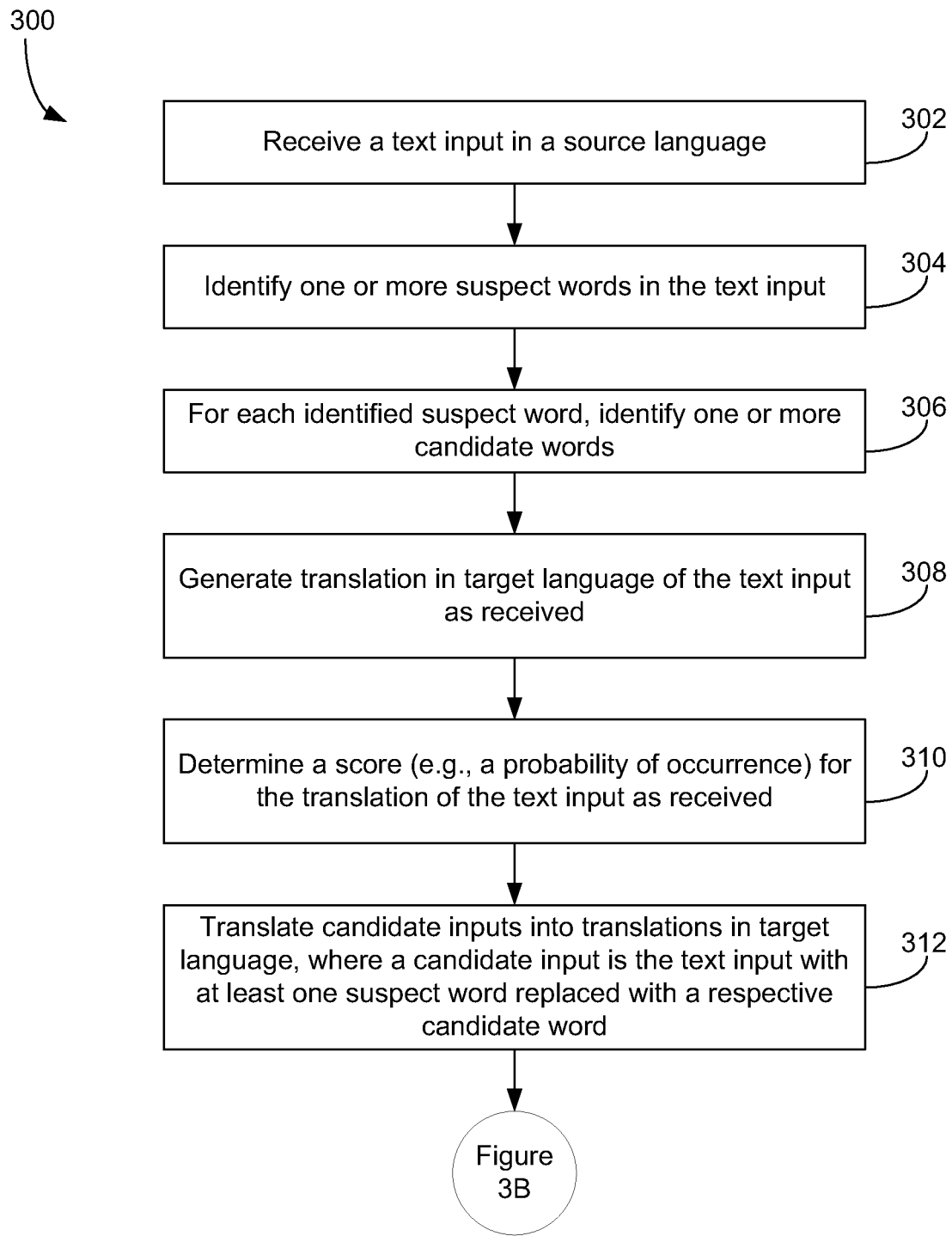
FIGS. 3A-3B are a flow diagram illustrating another example process for automatically correcting spelling in a machine translation input.
Figure 3B:
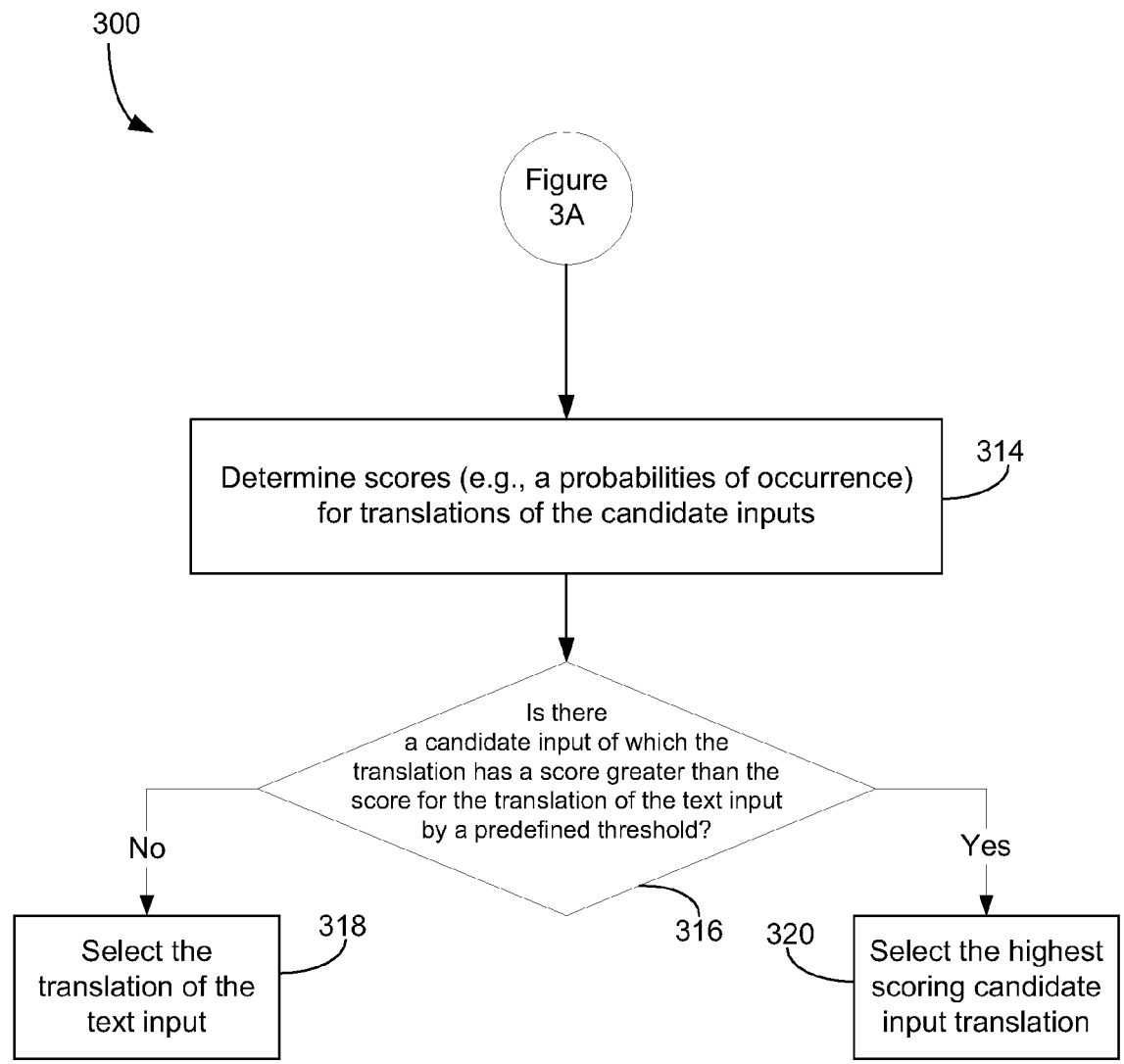

FIGS. 3A-3B are a flow diagram illustrating another example process 300 for automatically correcting spelling in a machine translation input. A text input is received by the machine translation system 106 (302). One or more suspect words in the text input are identified (304). For each identified suspect word, one or more candidate words are identified (306). Blocks 302-306 are the same as blocks 202-206 described above in reference to FIG. 2.

The text input as received is translated into a target language (308). A score for the translation is determined (310). In some implementations, the score for the translation is the probability of occurrence of the translation. The probability of occurrence of the translation can be determined from a language model for the target language and/or a translation model for translating the source language to the target language.

One or more candidate inputs in the source language are generated, and the candidate inputs are translated into the target language (312). Scores for the translations of the candidate inputs are determined (314). A candidate input is the text input with one or more of its suspect words replaced by a respective candidate word. In some implementations, the score for a translation is the probability of occurrence of the translation, determined using a language model associated with the target language and/or a translation model associated with the source and target languages.

If there is a candidate input whose translation has a score that is greater than the score of the translation of the text input by at least a predefined threshold (316—Yes), the highest scoring candidate input translation amongst the candidate input translations is selected (320). If multiple candidate input translations has scores that are greater than the score for the text input translation by at least the threshold, then the candidate translation with the highest score (e.g., highest probability of occurrence) is selected. If there is no candidate input whose translation has a score that is greater than that of the translation of the text input by at least the predefined threshold (316—No), the translation of the text input as received is selected (318). In some implementations, the predefined threshold is that the candidate input translation score be at least N times greater than the text input translation score, where N is a real number greater than 1.0. In some implementations, N is 10. In some other implementations, N is 2 or 3. The selected translation may be transmitted to a client 102 for presentation to a user, stored and/or processed further within the machine translation system, or transmitted to other computers for further processing or storage.

In some implementations, the process for translating the text inputs and candidate inputs and for determining scores for the translations includes generating a word lattice or word graph representing the text input and the candidate inputs. The word lattice, which includes weights, is provided to the translation module. As part of the translation process, the system selects a path in the word lattice corresponding to one of the input choices. The selected path represents a best (highest scoring) translation among the alternatives. In some implementations, the score threshold criterion is then be applied, if the highest scoring translation is associated with a candidate input, to determine if the translation for the candidate input should be selected. In some other implementations, the highest scoring translation is selected regardless of the score threshold criterion.

In some implementations, particular techniques are used to identify candidate words efficiently, rather than comparing the suspect word with the entire vocabulary. In some implementations, a trie of prefixes of the suspect word is generated. The trie includes nodes representing prefixes of the suspect word and strings formed from these prefixes that are different from the suspect word. From the trie, strings of a particular edit distance from the suspect word are identified. The identified strings whose frequencies in the vocabulary or language model are above a threshold are identified as candidate words.

Another optimization technique is to generate from a list of words (e.g., words in the vocabulary with a frequency that is higher than a specified minimum) a mapping from a word with a letter taken out to the original word, and also the word to itself. Such a mapping may have entries like:

"ca"→"cat can car"
"at"→"cat bat rat art ate at"
"ct"→"cat cot act"
"cat"→"cat cart"

When identifying candidate words, each letter (if the edit distance criterion is 1 or less; more may be taken out if the edit distance criterion is a larger number) is taken out of the suspect word in turn. For example, if the suspect word is "cet," the strings "et," "ct," "ce," and "cet" may be generated. Words that map from these strings are identified from the mapping. These words include words that are edit distance 1 from the suspect word, plus some others. A brute force edit distance comparison between these words, which is a smaller set than the entire vocabulary, and the suspect word may then be performed to find the candidate words.

In some implementations, the identification of candidate words also include identification of candidate combinations of words formed by splitting or dividing the suspect word into two, in order to account for the possibility that the suspect word is a concatenation of two words. An m-letter suspect word may be divided into two words m-1 ways. A candidate combination may be substituted for the suspect word. If a candidate input with a candidate word combination is the highest scoring candidate input and its score is higher than that of the text input by at least the predefined threshold, then the candidate input (with the word combination) is selected.

In some implementations, not all m-1 combinations generated from dividing an m-letter suspect need be identified as candidate word combinations. For example, in one exemplary implementation, combinations that leave one-letter words may be ignored. In another implementation, particular word combinations may be identified from a suspect word based on how the letters of the word is written in the source language and/or font used for the text input. That is, in some languages and/or fonts, particular combinations of adjacent letters may include a visually perceivable space. The visually perceivable space indicates a possible location where the author of the text input forgot to insert a whitespace and thus a possible candidate word combination.

FIG. 4 illustrates an example of a machine translation input and candidate inputs with candidate words substituted for the suspect word. In FIG. 4, the example text input to be translated is the sentence "I love going to the threater." A suspect word that may be identified in the text input sentence is "threater." Candidate words that may be identified for the suspect word "threater" may include "theater," "threat," "threaten," as well as divisions of "threater" into two strings, including "t hreater," "th reater," "thr eater," "thre ater," "threa ter," "threat er," and "threate r." The suspect word may be replaced by any of these candidates to form a candidate input. For example, if "threater" is replaced by "theater," then the candidate input "I love going to the theater" is formed. If "threater" is replaced by "threa ter," then the candidate input "I love going to the threa ter" is formed. Scores for text input and the candidate inputs, or for translations of them, may be determined in using processes 200 or 300 as described above.

The implementations described in this specification can help improve the quality of machine translation by finding and correcting spelling mistakes in the texts to be translated. The systems and techniques described in this specification may also be used to improve machine translation quality for languages that have regional spelling variations (e.g., British English vs. American English) or dialectical variations, as well as improving the machine translation quality of words that are written in an alternative form in the text to be translated (e.g., a noun is written in a plural form that is not known to the language model or the translation model).

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of what is disclosed here, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A method, comprising:
   receiving a text input for translation, the text input comprising words in a source language;
   calculating a first probability score for the text input, the first probability score indicating a likelihood that the text input is correct;
   identifying one or more words in the text input as suspect words, each suspect word representing a potential error in the text input;
   for each suspect word, identifying one or more candidate words, each candidate word corresponding to a specific suspect word and representing a potential word intended in the text input instead of the specific corresponding suspect word;
   determining, using one or more computing devices, a second probability score for each of the one or more candidate words, the second probability score for each specific candidate word representing a likelihood that the text input is correct when the specific corresponding suspect word is replaced by the specific candidate word;
   determining whether any of the second probability scores are greater than the first probability score by at least a predefined threshold that is greater than zero;
   when none of the second probability scores exceed the first probability score by greater than the score threshold:
      translating the text input to a target language to obtain a first translated text, and
      outputting the first translated text; and
   when one or more of the second probability scores exceeds the first probability score by greater than the score threshold:
      inserting the candidate word having a highest second probability score in place of the specific corresponding suspect word in the input text to obtain a modified text,
      translating the modified text to the target language to obtain a second translated text, and
      outputting the second translated text.

2. The method of claim 1, wherein identifying one or more words in the text input as suspect words comprises identifying as a suspect word a word in the text input that has a frequency of occurrence below a threshold, wherein the frequency of occurrence is derived from at least one of a vocabulary of character strings with corresponding frequencies of occurrence, a language model for the source language, or a translation model for translating the source language to the target language.

3. The method of claim 1, wherein identifying, for each suspect word, one or more candidate words comprises identifying, as candidate words for a respective suspect word, one or more words that have an edit distance from the suspect word less than a predefined edit distance threshold.

4. The method of claim 1, wherein
   identifying, for each suspect word, one or more candidate words comprises identifying one or more word combinations for a respective suspect word, wherein each of the word combinations comprises a plurality of character sequences generated by dividing the respective suspect word; and
   determining the second probability score for each of the one or more candidate words comprises determining a score for a respective candidate input, wherein the respective suspect word in the respective candidate input is replaced by a respective identified word combination.

5. The method of claim 1, wherein:
determining the first probability score for the text input comprises determining the first probability score for the text input based on a language model for the source language; and
determining the second probability score for each of the candidate words comprises determining the second probability score for each of the candidate words based on the language model for the source language.

6. The method of claim 1, wherein the first probability score for the text input indicates a probability of occurrence of the text input, and wherein the second probability score for a respective candidate word indicates a probability of occurrence of the respective candidate word.

7. A system comprising:
a user interface device; and
one or more computers operable to interact with the user interface device and to:
receive a text input for translation, the text input comprising words in a source language;
calculate a first probability score for the text input, the first probability score indicating a likelihood that the text input is correct;
identify one or more words in the text input as suspect words, each suspect word representing a potential error in the text input;
identify, for each suspect word, one or more candidate words, each candidate word corresponding to a specific suspect word and representing a potential word intended in the text input instead of the specific corresponding suspect word;
determine a second probability score for each of one or more candidate words, the second probability score for each specific candidate word representing a likelihood that the text input is correct when the specific corresponding suspect word is replaced by the specific candidate word;
determine whether any of the second probability scores are greater than the first probability score by at least a predefined threshold that is greater than zero;
when none of the second probability scores exceed the first probability score by greater than the score threshold:
translating the text input to a target language to obtain a first translated text, and
outputting the first translated text; and
when one or more of the second probability scores exceeds the first probability score by greater than the score threshold:
inserting the candidate word having a highest second probability score in place of the specific corresponding suspect word in the input text to obtain a modified text,
translating the modified text to the target language to obtain a second translated text, and
outputting the second translated text.

8. The system of claim 7, wherein the one or more computers are further operable to identify as a suspect word a word in the text input that has a frequency of occurrence below a threshold, wherein the frequency of occurrence is derived from at least one of a vocabulary of character strings with corresponding frequencies of occurrence, a language model for the source language, or a translation model for translating the source language to the target language.

9. The system of claim 7, wherein the one or more computers are further operable to identify, as candidate words for a respective suspect word, one or more words that have an edit distance from the suspect word less than a predefined edit distance threshold.

10. The system of claim 7, wherein the one or more computers are further operable to:
identify one or more word combinations for a respective suspect word, wherein each of the word combinations comprises a plurality of character sequences generated by dividing the respective suspect word; and
determine the second probability score for a respective candidate input, wherein the respective suspect word in the respective candidate input is replaced by a respective identified word combination.

11. A method, comprising:
receiving a text input for translation, the text input comprising words in a source language;
identifying one or more words in the text input as suspect words, each suspect word representing a potential error in the text input;
for each suspect word, identifying one or more candidate words, each candidate word corresponding to a specific suspect word and representing a potential word intended in the text input instead of the specific corresponding suspect word;
obtaining from a machine translation system, using one or more computing devices, a translation of the text input into a target language and a translation of each of one or more candidate inputs into the target language, each candidate input being the text input with one or more of the suspect words each replaced by a respective candidate word, wherein the source language and the target language are different natural languages;
determining a first probability score for the text input translation, the first probability score representing a likelihood that the text input translation is correct;
determining a second probability score for each of the candidate input translations, the second probability scores representing a likelihood that a specific candidate input translation is correct;
providing as the translation of the text input into the target language a particular candidate input translation if the second probability score of the particular candidate input translation is highest among the second probability scores for the candidate input translations and is greater than the first probability score by at least a predefined threshold that is greater than zero; and
providing the text input translation into the target language if the second probability score of none of the candidate input translations is greater than the first probability score by at least the predefined threshold.

12. The method of claim 11, wherein identifying one or more words in the text input as suspect words comprises identifying as a suspect word a word in the text input that has a frequency of occurrence below a threshold, wherein the frequency of occurrence is derived from at least one of a vocabulary of character strings with corresponding frequencies of occurrence, a language model for the source language, or a translation model for translating the source language to the target language.

13. The method of claim 11, wherein identifying, for each suspect word, one or more candidate words comprises identifying, as candidate words for a respective suspect word, one or more words that have an edit distance from the suspect word less than a predefined edit distance threshold.

14. The method of claim 11, wherein
identifying, for each suspect word, one or more candidate words comprises identifying one or more word combinations for a respective suspect word, wherein each of the word combinations comprises a plurality of character sequences generated by dividing the respective suspect word; and
obtaining a translation of each of one or more candidate inputs comprises obtaining a translation of a respective candidate input, wherein the respective suspect word in the respective candidate input is replaced by a respective identified word combination.

15. The method of claim 11, wherein:
determining the first probability score for the text input translation comprises determining the first probability score for the text input translation based on a language model for the target language;
determining the second probability score for each of the candidate input translations comprises determining the second probability score for each of the candidate input translations based on the language model for the target language.

16. The method of claim 11, wherein the first probability score for the text input translation indicates a probability of occurrence of the text input translation, and wherein the second probability score for a respective candidate input translation indicates a probability of occurrence of the respective candidate input translation.

17. A system comprising:
a user interface device; and
one or more computers operable to interact with the user interface device and to
receive a text input for translation, the text input comprising words in a source language;
identify one or more words in the text input as suspect words, each suspect word representing a potential error in the text input;
identify, for each suspect word, one or more candidate words, each candidate word corresponding to a specific suspect word and representing a potential word intended in the text input instead of the specific corresponding suspect word;
obtain from a machine translation system a translation of the text input into a target language and a translation of each of one or more candidate inputs into the target language, each candidate input being the text input with one or more of the suspect words each replaced by a respective candidate word, wherein the source language and the target language are different natural languages;
determine a first probability score for the text input translation, the first probability score indicating a likelihood that the text input translation is correct;
determine a second probability score for each of the candidate input translations, the second probability scores representing a likelihood that a specific candidate input translation is correct;
provide as the translation of the text input into the target language a particular candidate input translation if the second probability score of the particular candidate input translation is highest among the second probability scores for the candidate input translations and is greater than the first probability score by at least a predefined threshold that is greater than zero; and
providing the text input translation into the target language if the second probability score of none of the candidate input translations is greater than the first probability score by at least the predefined threshold.

18. The system of claim 17, wherein the one or more computers are further operable to identify as a suspect word a word in the text input that has a frequency of occurrence below a threshold, wherein the frequency of occurrence is derived from at least one of a vocabulary of character strings with corresponding frequencies of occurrence, a language model for the source language, or a translation model for translating the source language to the target language.

19. The system of claim 17, wherein the one or more computers are further operable to identify, as candidate words for a respective suspect word, one or more words that have an edit distance from the suspect word less than a predefined edit distance threshold.

20. The system of claim 17, wherein the one or more computers are further operable to:
identify one or more word combinations for a respective suspect word, wherein each of the word combinations comprises a plurality of character sequences generated by dividing the respective suspect word; and
obtain a translation of a respective candidate input, wherein the respective suspect word in the respective candidate input is replaced by a respective identified word combination.

21. The system of claim 17, wherein the first probability score for the text input translation indicates a probability of occurrence of the text input translation, and wherein the second probability score for a respective candidate input translation indicates a probability of occurrence of the respective candidate input translation.

22. A computer-implemented method, comprising:
receiving, at a server including one or more processors, a request from a computing device to translate a portion of web page from a source language to a target language, wherein the source language and the target language are different natural languages;
obtaining, at the server, a text corresponding to the portion of the web page, the text being in the source language;
calculating, at the server, a first probability score for the text, the first probability score indicating a likelihood that the text is correct;
identifying, at the server, any words in the text having a frequency of occurrence in a model of less than a frequency threshold to obtain one or more suspect words, each suspect word representing a potential error in the text;
determining, at the server, candidate words for each suspect word in the text, each candidate word representing a potential word intended in the text instead of a specific suspect word, each candidate word having an edit distance from its corresponding suspect word of less than an edit distance threshold;
calculating, at the server, a second probability score for each candidate word, each second probability score representing a likelihood of a specific candidate word occurring in the text;
determining, at the server, whether any of the second probability scores exceed the first probability score by greater than a score threshold that is greater than zero;
when none of the second probability scores exceed the first probability score by greater than the score threshold:
translating, at the server, the text to the target language to obtain a first translated text, and
outputting, from the server, the first translated text to the computing device, the first translated text causing the computing device to display a first modified version of the web page including the first translated text; and when one or more of the second probability scores exceeds the first probability score by greater than the score threshold:

inserting, at the server, the candidate word having the highest probability score in place of its corresponding suspect word in the text to obtain a modified text, translating, at the server, the modified text to the target language to obtain a second translated text, and outputting, from the server, the second translated text to the computing device, the second translated text causing the computing device to display a second modified version of the web page including the second translated text.

23. The computer-implemented method of claim 22, wherein the frequency threshold being based on at least one of the source language and a size of the model.

24. The computer-implemented method of claim 22, wherein the edit distance is a Levenshtein distance that represents a minimum number of single-character insertions, deletions, and substitutions required to obtain a specific candidate word from its corresponding suspect word.

25. The computer-implemented method of claim 22, wherein the score threshold is an integer multiple of the first probability score, and wherein the integer multiple is greater than one.

* * * * *